(12) United States Patent
Xing et al.

(10) Patent No.: US 12,489,351 B2
(45) Date of Patent: Dec. 2, 2025

(54) POWER CURRENT SIGNAL GENERATION USING SENSE TRANSISTORS

(71) Applicant: Infineon Technologies Canada Inc., Ottawa (CA)

(72) Inventors: Nan Xing, Allen, TX (US); Yinglai Xia, Plano, TX (US); Yalong Li, Allen, TX (US)

(73) Assignee: Infineon Technologies Canada Inc., Ottawa (CA)

( * ) Notice: Subject to any disclaimer, the term of this patent is extended or adjusted under 35 U.S.C. 154(b) by 358 days.

(21) Appl. No.: 18/185,098

(22) Filed: Mar. 16, 2023

(65) Prior Publication Data

US 2024/0313651 A1    Sep. 19, 2024

(51) Int. Cl.
    *H02M 1/00*    (2007.01)

(52) U.S. Cl.
    CPC .................. *H02M 1/0009* (2021.05)

(58) Field of Classification Search
    CPC ...... H02M 1/0009; G05F 1/565; G05F 1/573; G01R 19/0092
    See application file for complete search history.

(56) References Cited

U.S. PATENT DOCUMENTS

| | | | |
|---|---|---|---|
| 9,577,629 B2* | 2/2017 | Deboy | H03K 17/302 |
| 10,014,851 B2 | 7/2018 | Chauhan et al. | |
| 10,459,468 B1* | 10/2019 | Ankamreddi | H03K 17/0822 |
| 11,411,562 B2 | 8/2022 | Tranca et al. | |
| 2010/0117608 A1* | 5/2010 | Tseng | G05F 1/573 323/272 |
| 2010/0156379 A1* | 6/2010 | Marino | G01R 19/16552 323/293 |
| 2014/0253062 A1* | 9/2014 | Qin | G05F 1/10 323/282 |
| 2016/0178670 A1* | 6/2016 | Bernacchia | H10D 30/669 257/331 |
| 2017/0060152 A1* | 3/2017 | Martini | G05F 1/573 |

* cited by examiner

*Primary Examiner* — Alex Torres-Rivera
(74) *Attorney, Agent, or Firm* — WORKMAN NYDEGGER (57) ABSTRACT

A power transistor current sense circuit. The control nodes of each of a power transistor and sense transistors are connected. The input nodes of the power transistor and each of the sense transistors are also connected. A voltage divider is connected between a reference voltage source and the output node of a second sense transistor. A negative feedback circuit is connected between the output of the voltage divider and the output node of the first sense transistor. The negative feedback circuit forces a voltage at the output node of the first sense transistor to be approximately equal to the divided voltage. A power transistor current determination component measures a sense current that passes through the first sense transistor, and from that detects the current passing through the power transistor.

17 Claims, 11 Drawing Sheets

POWER CURRENT SIGNAL GENERATION USING SENSE TRANSISTORS

BACKGROUND OF THE INVENTION

Electronic circuits typically include transistors, which function as electronic switches that regulate or control current flow in portions of the circuit. One type of transistor is a field-effect transistor in which a voltage is applied to a gate terminal to turn the transistor on and off. A semiconductor channel region is disposed between the drain terminal and the source terminal. When the transistor is on, current flows through the semiconductor channel region between the source terminal and the drain terminal. When the transistor is off, lesser or no current flows through the semiconductor channel region between the source terminal and the drain terminal. The gate terminal is disposed over the semiconductor channel region between the source terminal and the drain terminal. Voltage on the gate terminal generates a field that affects whether the semiconductor channel region conducts current-hence the term "field-effect transistor".

Nevertheless, there are other types of transistors. In each transistor, current flows from an input node to an output node through a channel when the transistor is "turned on" by applying a sufficient voltage to a control node. For instance, in a field-effect transistor, the control node would be the gate terminal, the input node would be one of the source or drain terminals, and the output node would be the other of the source or drain terminals.

Typical transistors are used for amplifying and switching purposes in electronic circuits. On the other hand, power transistors are used to convey more substantial current, have higher voltage ratings, and may more typically be used in power supplies, battery charging, and the like. Power transistors can typically operate with currents greater than 1 amp to as much as a hundred amps or even greater. Power transistors may convey power greater than 1 watt to as many as hundreds of watts or even greater. Nonetheless, measurement of current passing through a power transistor can be beneficial.

The subject matter claimed herein is not limited to embodiments that solve any disadvantages or that operate only in environments such as those described above. Rather, this background is only provided to illustrate one example technology area where some embodiments described herein may be practiced.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments described herein relate to a circuit that allows for accurate sensing of a power current that flows through a power transistor. The circuit includes the power transistor, and multiple sense transistors. The power transistor and each of the multiple sense transistors includes a control node (e.g., a gate terminal if a field-effect transistor), an input node (e.g., a drain terminal if a field-effect transistor) from which current flows, and an output terminal (e.g., a source terminal if a field-effect transistor) to which current flows. The control nodes of the power transistor and each of the sense transistors are connected. The input nodes of the power transistor and each of the sense transistors are also connected.

The circuit also includes a voltage divider and a negative feedback circuit. The voltage divider is connected between a reference voltage source and the output node of a second sense transistor. The voltage divider outputs (or is configured to output) a divided voltage that is between the reference voltage and the voltage at the output node of the second sense transistor. The negative feedback circuit is connected between the output of the voltage divider and the output node of the first sense transistor. The negative feedback circuit forces (or is configured to force) a voltage at the output node of the first sense transistor to be approximately equal to the divided voltage.

The circuit includes a power transistor current determination component that measures (or is configured to measure) a sense current that passes through the first sense transistor when the first sense transistor is on. This occurs when a control voltage is applied to the connected control nodes, and an input voltage is applied to the connected input nodes. The power transistor current determination component uses (or is configured to use) the measured first sense transistor current to generate a signal representing a power current passing through the power transistor. For example, since the control nodes and input nodes of the transistors are connected, the first sense transistor is more likely to be on when the power transistor is on, and passing a sense current that is proportional to the current passing through the power transistor.

In this circuit, a signal representing the power current passing through the power transistor can be accurately generated without the use of a sense resistor coupled in series with the transistor, thus improving accuracy, increasing energy efficiency, and reducing heat generation. Further, the negative feedback circuit allows the voltage drop ratio between the power transistor input and output nodes and the first sense transistor input and output nodes to become relatively fixed without the requirement of a large negative voltage supply.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which.

DETAILED DESCRIPTION OF THE INVENTION

Embodiments described herein relate to a circuit that allows for accurate sensing of a power current that flows through a power transistor. The circuit includes the power transistor, and multiple smaller sense transistors. The power transistor and each of the multiple sense transistors includes a control node (e.g., a gate terminal if a field-effect transistor), an input node (e.g., a drain terminal if a field-effect transistor) from which current flows, and an output terminal (e.g., a source terminal if a field-effect transistor) to which current flows. The control nodes of the power transistor and each of the sense transistors are connected. The input nodes of the power transistor and each of the sense transistors are also connected.

The circuit also includes a voltage divider and a negative feedback circuit. The voltage divider is connected between a reference voltage and the output node of a second sense transistor. That reference voltage is also applied at the output terminal of the power transistor. The voltage divider outputs (or is configured to output) a divided voltage that is between the reference voltage and the voltage at the output node of the second sense transistor. The negative feedback circuit is connected between the output of the voltage divider and the output node of the first sense transistor. The negative feedback circuit forces (or is configured to force) a voltage at the output node of the first sense transistor to be approximately equal to the divided voltage.

The circuit includes a power transistor current determination component that measures (or is configured to measure) a sense current that passes through the first sense transistor when the first sense transistor is on. This occurs when a control voltage is applied to the connected control nodes, and an input voltage is applied to the connected input nodes. The power transistor current determination component uses (or is configured to use) the measured first sense transistor current to generate a signal representing a power current passing through the power transistor. For example, since the control nodes and input nodes of the transistors are connected, the first sense transistor is more likely to be on when the power transistor is on, and passing a sense current that is proportional to the current passing through the power transistor.

This proportionality is relatively stable across of wide variety of operating conditions. Thus, the structure provides a highly accurate signal that represents the power current. Furthermore, this is done without using a sense resistor that is in series with the power transistor. Thus, the structure consumes less power and generates less heat than conventional technologies that use a sense resistor connected in series with the power transistor.

Figure 1:
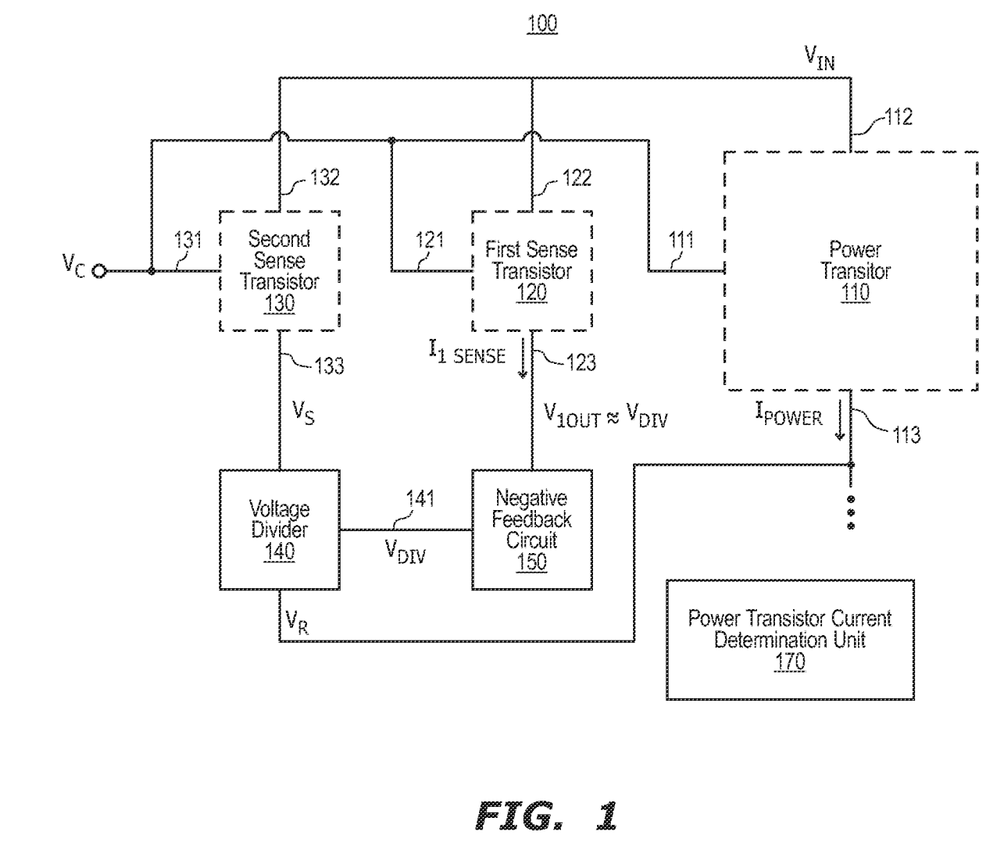
FIG. 1 illustrates a circuit that generates a high accuracy signal representing a power current passing through a power transistor, in accordance with the principles described herein.

FIG. 1 illustrates a circuit 100 in which the principles described herein may be practiced. The circuit 100 is just one embodiment of the principles described herein. The circuit 100 includes a power transistor 110, a first sense transistor 120 and a second sense transistor 130. The power transistor 110 is larger than the first sense transistor 120 and the second sense transistor 130. The size of a transistor may be defined by the total area in which current can flow- referred to as "current flow width" herein. As an example, for a field-effect transistor, the size of the transistor may be characterized by gate width. The principles described herein are not limited to what the relative size is between the transistors. However, in some embodiments, the ratio of the current flow width of the power transistor 110 over the current flow width of either of the sense transistors 120 or 130 is 500 or more.

The power transistor 110 includes a control node 111 that controls whether current flows from an input node 112 to an output node 113. The first sense transistor 120 also has a control node 121 that controls whether current flows from its input node 122 to its output node 123. The second sense transistor 130 likewise has a control node 131 that controls whether current flows from its input node 132 to its output node 133. The control nodes 111, 121 and 131 of each of the three transistors 110, 120 and 130 are connected together. In addition, the input nodes 112, 122 and 132 of each of the three transistors 110, 120 and 130 are also connected together.

In operation, a control voltage $V_C$ is applied to the connected control nodes 111, 121 and 131; and an input voltage $V_{IN}$ is applied to the connected input nodes 112, 122 and 132. The control voltage $V_C$ is sufficient that the power transistor 110 is on. In this state, the power transistor 110 passes some amount of power current, which is called herein power current $I_{POWER}$. The embodiments described herein more accurately measure power current $I_{POWER}$. The control voltage $V_C$ also causes the first sense transistor 120 to pass a sense current $I_{1SENSE}$, and causes the second sense transistor 130 to have a voltage $V_S$ present at its output node 133.

The circuit 100 also includes a voltage divider 140 and a negative feedback circuit 150. The voltage divider 140 is connected between the output node 133 of the second sense transistor 130 and the-reference voltage $V_R$. During operation, the voltage divider 140 provides at its output node 141 a divided voltage $V_{DIV}$ that is between a source voltage $V_S$ that is present on the output node 133 of the second sense transistor 130 and the reference voltage $V_R$. In some embodiments, the reference voltage $V_R$ could be ground.

The negative feedback circuit 150 is connected between the output node 141 of the voltage divider 140 and the output node 123 of the first sense transistor 120. During operation, the negative feedback circuit 150 receives the divided voltage $V_{DIV}$ from the voltage divider 140, and forces a voltage $V_{1OUT}$ present at the output node 123 of the first sense transistor 120 to be approximately equal to the divided voltage $V_{DIV}$. Due to practical limits, the voltage $V_{1OUT}$ present at the output node 123 cannot be exactly the divided voltage $V_{DIV}$, the voltage $V_{1OUT}$ is preferably as close as possible to the divided voltage $V_{DIV}$. As an example, the voltage $V_{1OUT}$ in some embodiments is within 0.01 volts of the divided voltage $V_{DIV}$. That is, the difference between $V_{1OUT}$ and the divided voltage $V_{DIV}$ may just be a matter of millivolts or even less.

The circuit 100 also includes a power transistor current determination component 170. During operation, the power transistor current determination component 170 measures the sense current $I_{1SENSE}$ that passes through the first sense transistor 120. The power transistor current determination component 170 further uses the measured sense current $I_{1SENSE}$ to generate a signal representing the power current $I_{POWER}$ passing through the power transistor 110. In some embodiments, the size ratio (e.g., the current flow width ratio) between the power transistor and one or both of the sense transistors can be used to generate the signal representing the power current $I_{POWER}$ passing through the power transistor 110.

In some embodiments, the negative feedback circuit 150 can also be powered via the same control voltage $V_C$ supplied to the control nodes 111, 121 and 131. In this embodiment, the negative feedback circuit 150 does not need a separate high voltage supply. This simplifies the manufacturing process, and reduces operational complexity since the high voltage supply does not need to be separately generated and regulated.

The circuit 100 allows for higher accuracy when generating the signal that represents the power current $I_{POWER}$ because the power current depends strongly on the sense current $I_{1SENSE}$, even across a wide variety of operating conditions. In some embodiments, the power current $I_{POWER}$ is largely proportional to the sense current $I_{1SENSE}$, even across a wide variety of operating conditions. Thus, even in the presence of a myriad of operating conditions, the power current $I_{POWER}$ can still be reliably determined with high accuracy from the sense current $I_{1SENSE}$.

To understand why the current $I_{POWER}$ so strongly depends on the sense current $I_{1SENSE}$, key operational principles will now be explained with respect to a sequence of equations. In this example, it will be assumed that the reference voltage $V_R$ is ground, in which case, the power current $I_{POWER}$ is proportional to the sense current $I_{1SENSE}$.

First, with the reference voltage $V_R$ being zero, the divided voltage $V_{DIV}$ can be expressed as some fixed percentage of the voltage $V_S$ at the output node 133. Suppose that percentage is $Z$ % of the voltage $V_S$ (where "Z" is a number between 0 and 100). In that case, the voltage divider output voltage $V_{DIV}$ may be expressed as the following in Equation 1:

$$V_{DIV} = Z\% \times V_S \tag{1}$$

In the case in which the control voltage $V_C$ turns the second sense transistor 130 on, the resistance of the second sense transistor 130 is minimal. Thus, when the second sense transistor 130 is on, the voltage $V_S$ at the output node 133 will be approximately the same as the input voltage $V_{IN}$. Thus, in this case, the divided voltage $V_{DIV}$ may instead be expressed as in Equation 2:

$$V_{DIV} = Z\% \times V_{IN} \tag{2}$$

The negative feedback circuit 150 forces the output node voltage $V_{1OUT}$ at the output node 123 of the first sense transistor 120 to be approximately equal to the divided voltage $V_{DIV}$. Thus, assuming again that the second sense transistor 130 is on, the voltage $V_{1OUT}$ at the output node of the first sense transistor 120 may be expressed as in Equation 3:

$$V_{1OUT} = Z\% \times V_{IN} \tag{3}$$

The voltage difference $V_{1DIFF}$ across the first sense transistor 120 is equal to the difference between the voltage $V_{IN}$ at its input node 122 and the voltage $V_{1OUT}$ at its output node 123. This is expressed in the following Equation 4:

$$V_{1DIFF} = V_{IN} - V_{1OUT} \tag{4}$$

Substituting $V_{1OUT}$ from the Equation 3 into Equation 4 yields the following Equation 5:

$$V_{1DIFF} = V_{IN} - Z\% \times V_{IN} \tag{5}$$

Rewriting Equation 5 yields the following Equation 6:

$$V_{1DIFF} = V_{IN} \times (1 - Z\%) \tag{6}$$

Now, assuming that the output node 113 of the power transistor 110 is at zero volts, the voltage $V_{PDIFF}$ across the power transistor 110 is equal to the input voltage $V_{IN}$ (i.e., $V_{PDIFF} = V_{IN}$). Thus, Equation 6 can be rewritten in terms of $V_{PDIFF}$ as in the following Equation 7:

$$V_{1DIFF} = V_{PDIFF} \times (1 - Z\%) \tag{7}$$

Rewriting Equation 7 into a ratio of $V_{PDIFF}$ and $V_{1DIFF}$ yields the following Equation 8:

$$V_{PDIFF} / V_{1DIFF} = 1 / (1 - Z\%) \tag{8}$$

The power current $I_{POWER}$ through the power transistor 110 can be expressed as the voltage $V_{PDIFF}$ across the power transistor 110 divided by the resistance $R_{POWER}$ of the power transistor 110, and can be expressed as in the following Equation 9:

$$I_{POWER} = V_{PDIFF} / R_{POWER} \qquad (9)$$

The sense current $I_{1SENSE}$ through the first sense transistor 120 can be expressed as the voltage $V_{1DIFF}$ across the first sense transistor 120 divided by the resistance $R_{1SENSE}$ of the first sense transistor 120, and can be expressed as in the following Equation 10:

$$I_{1sense} = V_{1DIFF} / R_{1SENSE} \qquad (10)$$

By dividing Equation 9 by Equation 10, the ratio between the power current $I_{POWER}$ and the sense current $I_{1SENSE}$ can be expressed as in the following Equation 11:

$$I_{POWER} / I_{1SENSE} = (V_{PDIFF} / R_{POWER}) / (V_{1DIFF} / R_{1SENSE}) \qquad (11)$$

Rewriting Equation 11 yields the following Equation 12:

$$I_{POWER} / I_{1SENSE} = (V_{PDIFF} / R_{POWER}) \times (R_{1SENSE} / V_{1DIFF}) \qquad (12)$$

Rewriting Equation 12 yields the following Equation 13:

$$I_{POWER} / I_{1SENSE} = (V_{PDIFF} / V_{1DIFF}) \times (R_{1SENSE} / R_{POWER}) \qquad (13)$$

A constant N may be used to express the ratio of transistor resistances ($R_{1sense}/R_{POWER}$). The constant N may be, for example, the size ratio (e.g., 500 or greater) between the power transistor 110 and the first sense transistor 120. In this case, the resistance of the smaller first sense transistor 120 is N times higher than the resistance of the larger power transistor 110 (i.e., $R_{1SENSE}/R_{POWER}=N$). Substituting the constant N into Equation 13 yields the following Equation 14:

$$I_{POWER} / I_{1SENSE} = (V_{PDIFF} / V_{1DIFF}) \times N \qquad (14)$$

Substituting Equation 8 into Equation 14 yields the following Equation 15:

$$I_{POWER} / I_{1SENSE} = (1 / (1 - Z\%)) \times N \qquad (15)$$

Thus, by multiplying both sides of Equation 15 by $I_{1sense}$, the power current $I_{POWER}$ can be determined by the following Equation 16:

$$I_{POWER} = (1 / (1 - Z\%)) \times N \times I_{1SENSE} \qquad (16)$$

Notice that Z % is substantially fixed as voltage dividers typically operate to provide a divided voltage that has a relatively constant value for Z. Furthermore, N can also be made substantially constant by making the type of the sense transistor 120 and the type of the power transistor 110 the same, thus having similar temperature variances. Furthermore, when the power transistor 110 and the sense transistor 120 are manufactured on the same chip, processing variations that are applied to the power transistor 110 are also more likely applied to the first sense transistor 120 due to their proximity, and due to their being subject to the same manufacturing techniques, imperfections and materials. Accordingly, once the sense current $I_{1SENSE}$ that passes through the first sense transistor 120 has been measured, the power current $I_{POWER}$ can be determined across a wide variety of operating conditions.

N may also be made more fixed if the power transistor 110, first sense transistor 120 and second sense transistor 130 have approximately the same control voltage. This helps the transistors 110, 120 and 130 be on and off at approximately the same time. The control voltage of a transistor is the voltage difference between the control node and the output node the transistor in order for the transistor to conduct current from its input node to its output. It is preferred that the control voltages be as close as possible. However, in practicality, the control voltages can never be the same for the power and sense transistors, as their output nodes voltages are slightly different. In some embodiments, the transistors 110, 120 and 130 have a control voltage that is within 0.2 volts of each other, within 0.1 volts of each other, or within 0.05 volts of each other.

In some embodiments, that the threshold voltages of these transistors are approximately the same by having each of the power transistor 110, first sense transistor 120 and second sense transistor 130 be manufactured on the same semiconductor substrate using the same semiconductor manufacturing techniques. For example, in some embodiments, each of the power transistor 110, first sense transistor 120 and second sense transistor 130 can be gallium-nitride field-effect transistors (GaN FETs).

Figure 2:
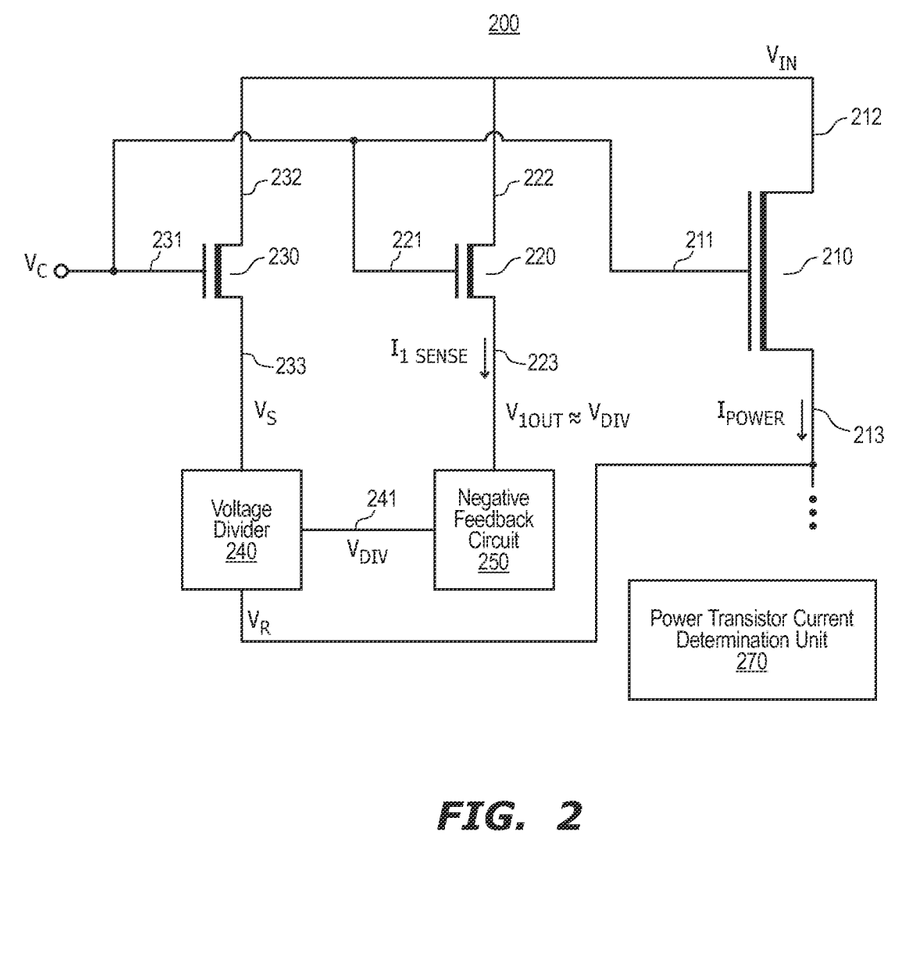
FIG. 2 illustrates an example of the circuit of FIG. 1, in which the power transistor and the sense transistors are each field-effect transistors.

The principles described herein are not limited to the type of the transistors 110, 120 and 130. Accordingly, in FIG. 1, the transistors 110, 120 and 130 are represented symbolically using dashed-lined boxes. However, in a more specific embodiment, the transistors may be field-effect transistors. FIG. 2 illustrates such an embodiment. Specifically, FIG. 2 illustrates a circuit 200 that includes a power field-effect transistor 210, a first sense field-effect transistor 220 and a second sense field-effect transistor 230. The power field-effect transistor 210 is an example of the power transistor 110 of FIG. 1, the first sense field-effect transistor 220 is an example of the first sense transistor 120 of FIG. 1, and the second field-effect transistor 230 is an example of the second sense transistor 130 of FIG. 1.

The control nodes of the field-effect transistors are each gate nodes. Accordingly, the gate node 211 of the power field-effect transistor 210 is an example of the control node 111 of the power transistor 110 of FIG. 1. Likewise, the gate node 221 of the first sense field-effect transistor 220 is an example of the control node 121 of the first sense transistor 120 of FIG. 1. Also, the gate node 231 of the second sense field-effect transistor 230 is an example of the control node 131 of the second sense transistor 130 of FIG. 1. Furthermore, the drain nodes 212, 222 and 232 of the respective transistors 210, 220 and 230 are examples of the respective input nodes 112, 122 and 132 of FIG. 1. Lastly, the source nodes 213, 223 and 233 of the respective transistors 210, 220 and 230 are examples of the respective output nodes 113, 123 and 133 of FIG. 1. The voltage divider 240, the negative feedback circuit 250 and the power transistor current determination component 270 may be the same as the voltage divider 140, the negative feedback circuit 150 and the power transistor current determination component 170 of FIG. 1. Furthermore, the circuit 200 of FIG. 2 operates as described above for the circuit 100 of FIG. 1.

Figure 3:
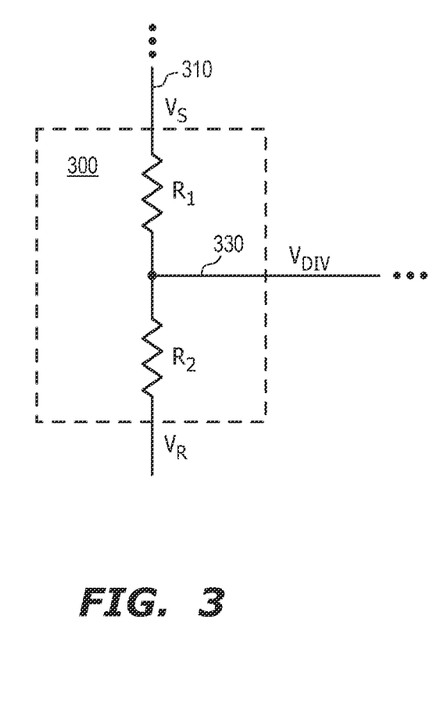
FIG. 3 illustrates a voltage divider, which is an example of the voltage divider of FIG. 1 or the voltage divider of FIG. 2.

As previously mentioned, the voltage divider 140 outputs a divided voltage $V_{DIV}$. FIG. 3 illustrates a voltage divider 300, which is an example of the voltage divider 140 of FIG. 1 or the voltage divider 240 of FIG. 2. The voltage divider 300 of FIG. 3 comprises a plurality of resistors (labelled R1 and R2) coupled in series between a second sense transistor output node 310 and a reference voltage $V_R$. The second sense transistor output node 310 is, for example, the output node 133 of the second sense transistor 130 of FIG. 1 or the source node 233 of the second sense field-effect transistor 230 of FIG. 2. A divider output node 330 is between the resistors R1 and R2. The divider output node 330 is, for example, the divider output node 141 of the voltage divider 140 of FIG. 1 or the divider output node 241 of the voltage divider 240 of FIG. 2.

In the case of FIG. 3, the voltage divider outputs a divided voltage $V_{DIV}$ that is equal to $V_R + (V_S - V_R) \times R_2/(R_1 + R_2)$. Of course, if the reference voltage is zero, the divided voltage $V_{DIV}$ is equal to $V_S \times R_2/(R_1 + R_2)$. Thus, in this case, Z is equal to $100 \times R_2/(R_1 + R_2)$. Since the resistors are similar, Z is relatively stable, which contributes to the accuracy of the relationship between the sense current $I_{1SENSE}$ and the power current $I_{POWER}$.

The voltage divider 300 provides a divided voltage $V_{DIV}$ at the divider output node 330, the divided voltage $V_{DIV}$ being between a source voltage $V_S$ when present on the second sense transistor output node 310 and a reference voltage $V_R$ when provided by the reference voltage source 320. Further, in some embodiments, the voltage divider 300 may further comprise one or more capacitors coupled in series with the plurality of resistors between the second sense transistor output node 310 and the reference voltage source 320.

Figure 4:
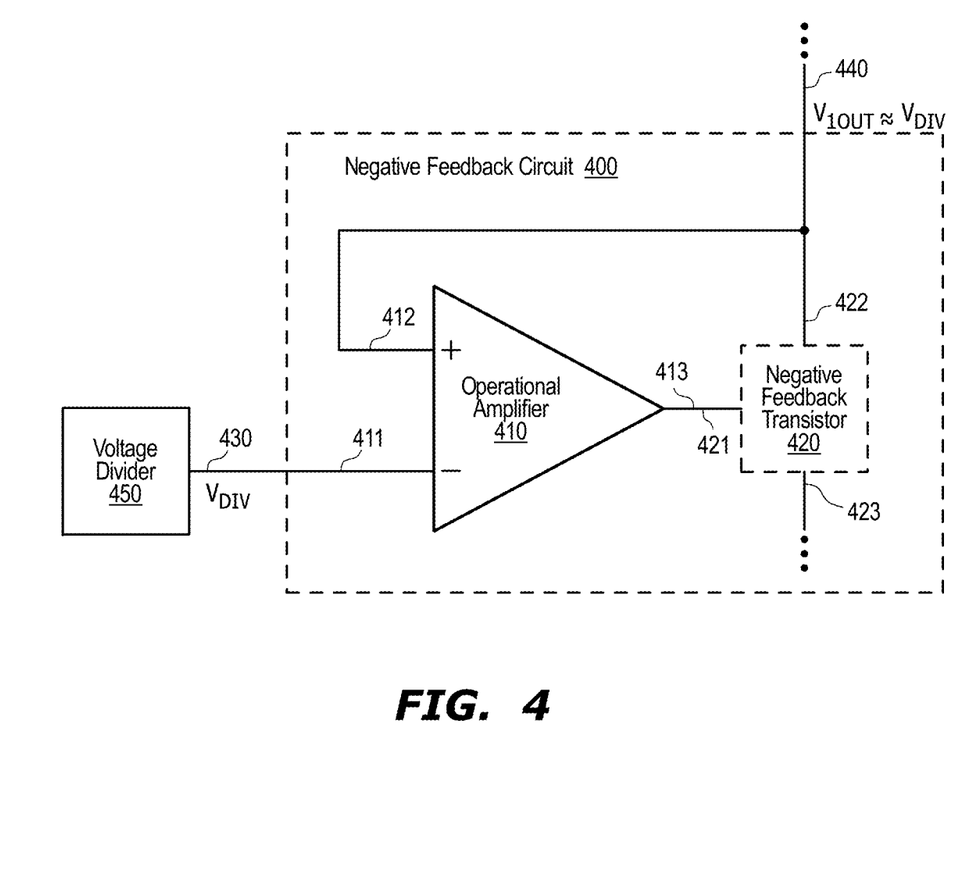
FIG. 4 illustrates a negative feedback circuit, which is an example of the negative feedback circuit of FIG. 1 and the negative feedback circuit of FIG. 2.

FIG. 4 illustrates a negative feedback circuit 400, which is an example of the negative feedback circuit 150 of FIG. 1 and the negative feedback circuit 250 of FIG. 2. The negative feedback circuit 400 of FIG. 4 includes an operational amplifier 410 and a negative feedback transistor 420. The operational amplifier 410 has a negative input node 411, a positive input node 412 and an output node 413. The negative input node 411 is connected to a divider output node 430. The divider output node 430 is, for example, the divider output node 141 of FIG. 1 or the divider output node 241 of FIG. 2. The positive input node 412 is connected to a first sense transistor output node 440. The first sense transistor output node 440 is, for example, the output node 123 of the first sense transistor 120 of FIG. 1 or the output node 223 of the first sense transistor 220 of FIG. 2.

The negative feedback transistor 420 has a control node 421 that controls whether current flows from an input node 422 to an output node 423. The negative feedback transistor 420 could be, for example, a field-effect transistor. The control node 421 of the negative feedback transistor 420 is connected to the output node 413 of the operational amplifier 410. The input node 422 of the negative feedback transistor 420 is connected to the first sense transistor output node 440.

The negative feedback circuit 400 forces a first sense transistor output node voltage $V_{1OUT}$ to be approximately equal to the divided voltage $V_{DIV}$ when the divided voltage $V_{DIV}$ is present on the divider output node 430. For instance, if the voltage $V_{1OUT}$ at the output node 430 was to become higher than the divided voltage $V_{DIV}$, the operational amplifier 410 would output a higher signal, thereby turning on the negative feedback transistor 420 slightly more to thereby reduce the resistance of the negative feedback transistor 420 and reduce the voltage of $V_{1OUT}$. On the other hand, if the voltage $V_{1OUT}$ at the output node 430 was to become lower than the divided voltage $V_{DIV}$, the operational amplifier 410 would output a lower signal, thereby turning off the negative feedback transistor 420 slightly more to thereby increase the resistance of the negative feedback transistor 420 and increase the voltage $V_{1OUT}$. Thus, the configuration of FIG. 4 operates to stabilize the voltage $V_{1OUT}$ so as to be approximately the same as the divided voltage $V_{DIV}$.

Figure 5:
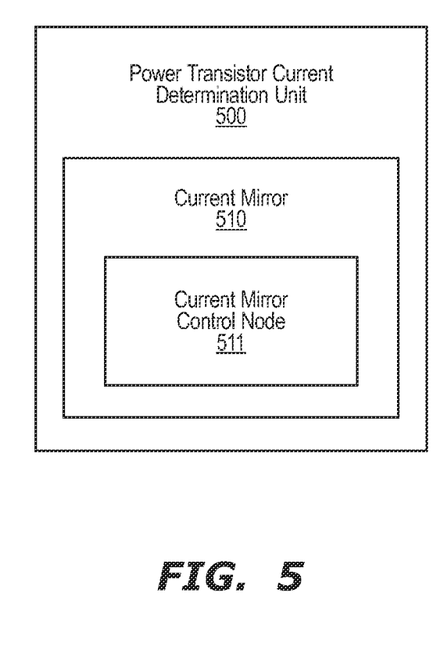
FIG. 5 illustrates a power transistor current determination component, which is an example of the power transistor current determination component of FIG. 1 and the power transistor current determination component of FIG. 2.

FIG. 5 illustrates a power transistor current determination component 500, which is an example of the power transistor current determination component 170 of FIG. 1 and the power transistor current determination component 270 of FIG. 2. The power transistor current determination component 500 includes a current mirror 510. The current mirror 510 is configured to mirror the sense current $I_{1sense}$ that passes through the first sense transistor 120 or the first sense field-effect transistor 220. In some embodiments, the current mirror 510 could comprise or could itself be a transistor, such as a field-effect transistor. In such an embodiment, such a current mirror transistor has a control node 511 that is connected to the control node 421 of the negative feedback transistor 420. In this manner, the current mirror 510 could mirror the sense current $I_{1ENSE}$ that passes through the first sense transistor 120 or first sense field-effect transistor 220.

Figure 6:
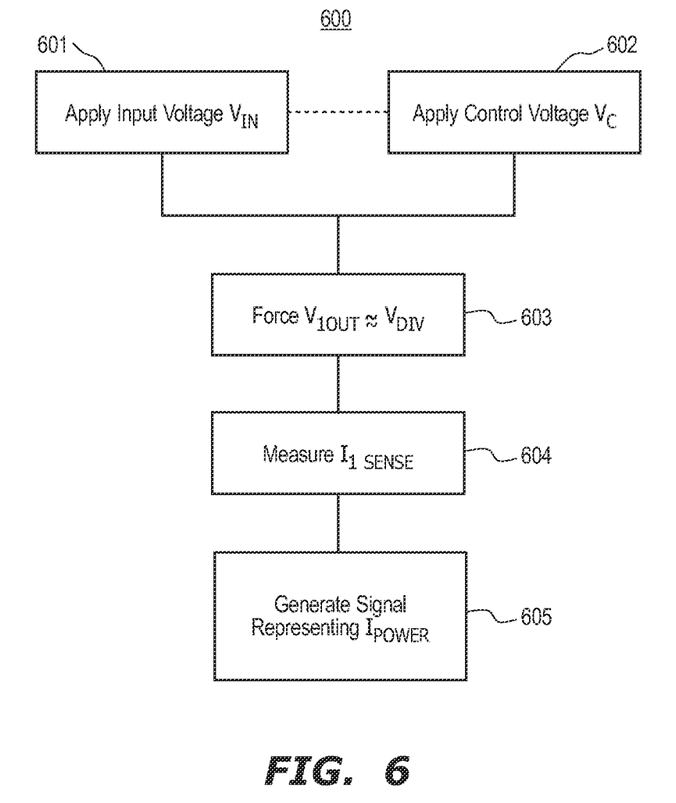
FIG. 6 illustrates a flowchart of a method of generating a signal representing a power current passing through a power transistor, in accordance with the principles described herein.

FIG. 6 illustrates a flowchart of a method 600 of generating a signal representing a power current passing through a power transistor, in accordance with the principles described herein. As the method 600 may be performed within the circuit 100 of FIG. 1, the method 600 will be described with frequent reference to the circuit 100 of FIG. 1.

The method 600 includes applying an input voltage to connected input nodes of a power transistor and at least two sense transistors (act 601). For example, with respect to FIG. 1, an input voltage $V_{IN}$ is applied to a power transistor input node 112 of the power transistor 110, a first sense transistor input node 122 of a first sense transistor 120, and a second sense transistor input node 132 of a second sense transistor 130.

The method 600 also includes applying a control voltage to connected control nodes of the power transistor and the at least two sense transistors (act 602). For example, with respect to FIG. 1, a control voltage $V_C$ is applied to the control node 111 of the power transistor 110, a first sense transistor control node 121 of the first sense transistor 120, and a second sense transistor control node 131 of the second sense transistor 130.

While the input voltage is being applied (act 601) and the control voltage is being applied (act 602), an output voltage of one of the sense transistors is forced to be approximately equal to a divided voltage (act 603). That divided voltage is a divided voltage between a reference voltage and a voltage at an output node of the second sense transistor. For instance, in FIG. 1, the voltage $V_{1OUT}$ present at an output node 123 of the first sense transistor 120 is forced to be approximately equal to a divided voltage $V_{DIV}$.

The method 600 also includes measuring a first sense transistor current that passes through the first transistor (act 604). In FIG. 1, for example, the sense current $I_{1SENSE}$ is measured.

Finally, a signal representing the power current is generated using the measured sense current (act 605). In FIG. 1, for example, the measured sense current $I_{1SENSE}$ is used to generate a signal representing the power current $I_{POWER}$ passing through the power transistor 110.

Figure 7:
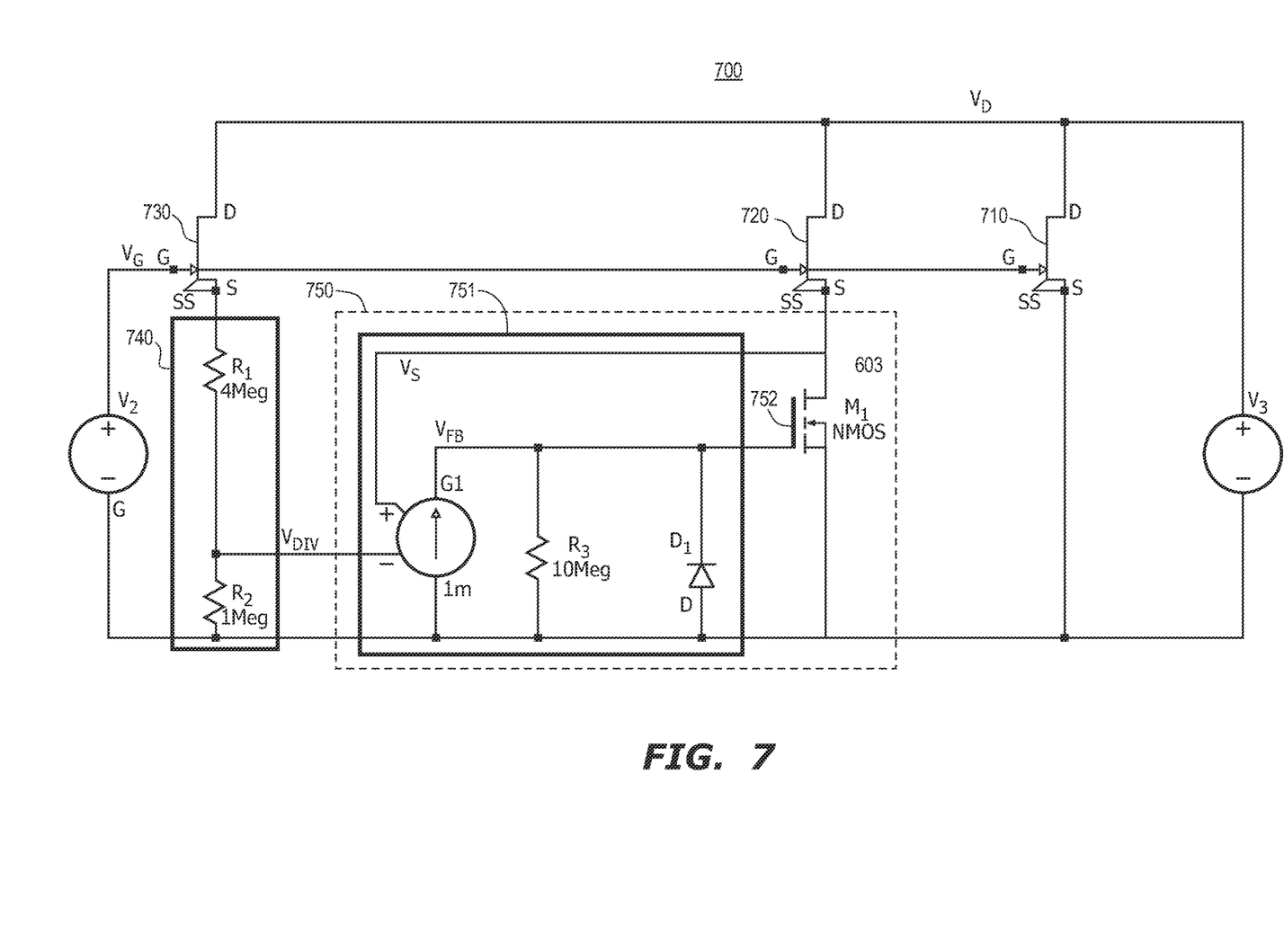
FIG. 7 illustrates an example circuit layout that is generated using a simulation program.

FIG. 7 illustrates an example circuit layout 700 that is generated using LTSPICE®. The example circuit layout 700 shows a circuit that is an example of the circuit 100 of FIG. 1 or the circuit 200 of FIG. 2. Here, the power transistor 710 is an example of the power transistor 110 of FIG. 1, and the power field-effect transistor 210 of FIG. 2. Additionally, the first sense transistor 720 is an example of the first sense transistor 120 of FIG. 1, and the first sense field-effect transistor 220 of FIG. 2. Further, the second sense transistor 730 is an example of the second sense transistor 130 of FIG. 1, and the second sense field-effect transistor 230 of FIG. 2. In the example circuit layout 700, the transistors 710, 720 and 730 are field-effect transistors, and thus each have a gate node, drain node and source node.

A control voltage source V2 supplies a control voltage of six volts to the gate nodes of the transistors 710, 720 and 730. The control voltage is, for example, the control voltage $V_C$ of the circuit 100 of FIG. 1 or the circuit 200 of FIG. 2. An input voltage source V3 supplies an input voltage to the drain nodes of the transistors 710, 720 and 730. The input voltage is, for example the input voltage $V_{IN}$ of the circuit 100 of FIG. 1 or the circuit 200 of FIG. 2.

The voltage divider 740 supplies a divided voltage $V_{DIV}$ to the negative feedback circuit 750. The voltage divider 740 is an example of the voltage divider 140 of FIG. 1, the voltage divider 240 of FIG. 2, or the voltage divider 300 of FIG. 3. The voltage divider 740 includes resistors R1 and R2 which are examples of the respective resistors R1 and R2 of the voltage divider 300 of FIG. 3. The negative feedback circuit 750 includes the components within the dashed box and includes an operational amplifier 751 and a negative feedback transistor 752. The operational amplifier 751 is an example of the operational amplifier 410 of FIG. 4. The negative feedback transistor 752 is an example of the negative feedback transistor 420 of FIG. 4.

Figure 8:
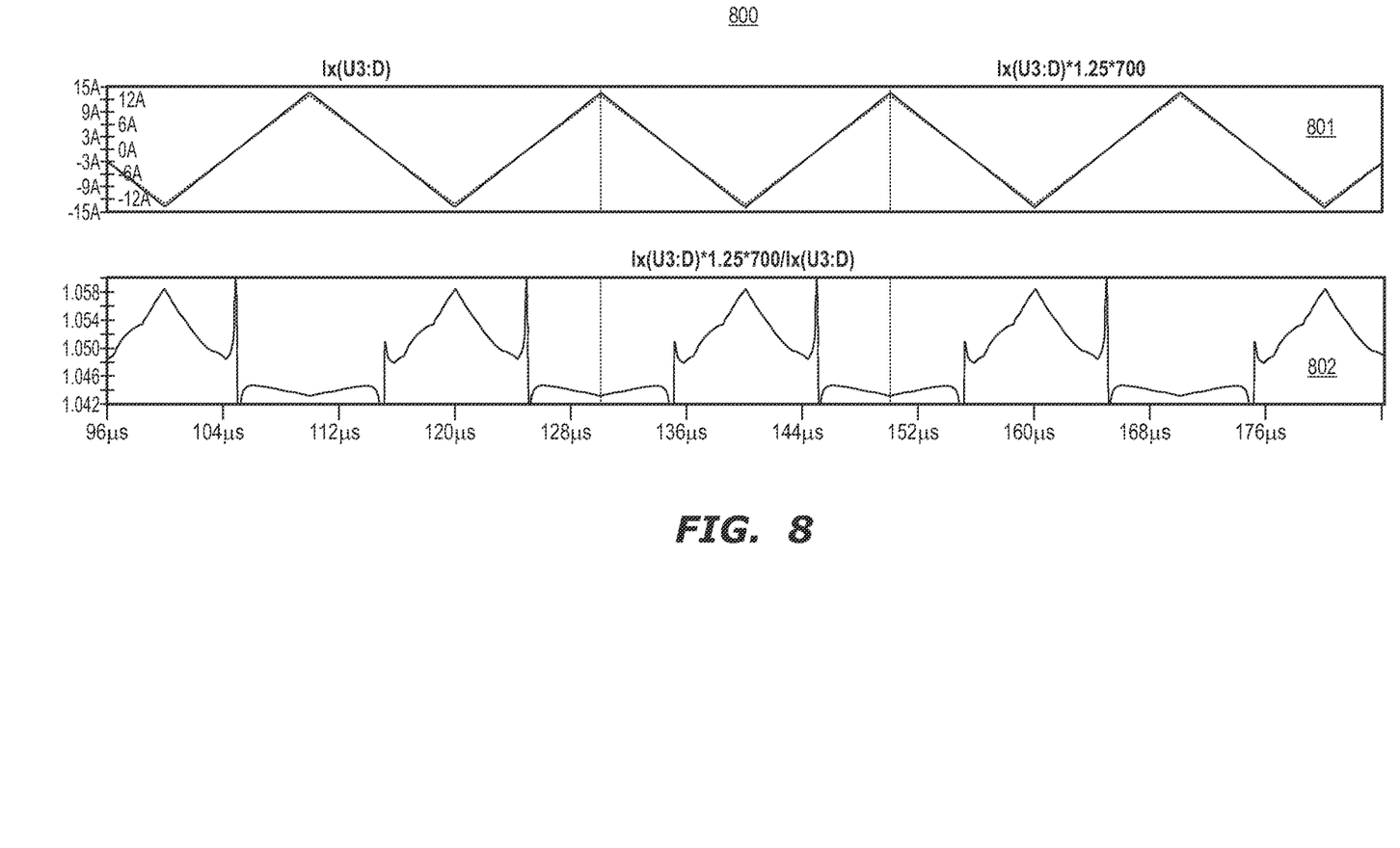
FIG. 8 illustrates a signal diagram collection showing various results from running simulations of the example circuit of FIG. 7.

FIG. 8 illustrates a signal diagram collection 800 showing various results from running simulations of the example circuit layout 700 of FIG. 7. There are two signal diagrams 801 and 802 in the signal diagram collection. Each of the signal diagrams 801 and 802 shows time in the horizontal axis.

The first signal diagram 801 shows two substantially overlapping waveforms including the power current, and the sense current (after having been normalized by multiplying by 700×1.25). Power current is allowed to vary as an approximately triangular waveform for testing purposes. The sense current is of course much smaller than the power current. Accordingly, to demonstrate that the sense current truly is substantially proportional to the power current, the sense current has been multiplied by a constant in the first signal diagram 801. The signal diagram 802 shows a normalized ratio of the sense current over the power current. Note that the ratio is relatively stable fluctuating only a few percent.

Figure 9:
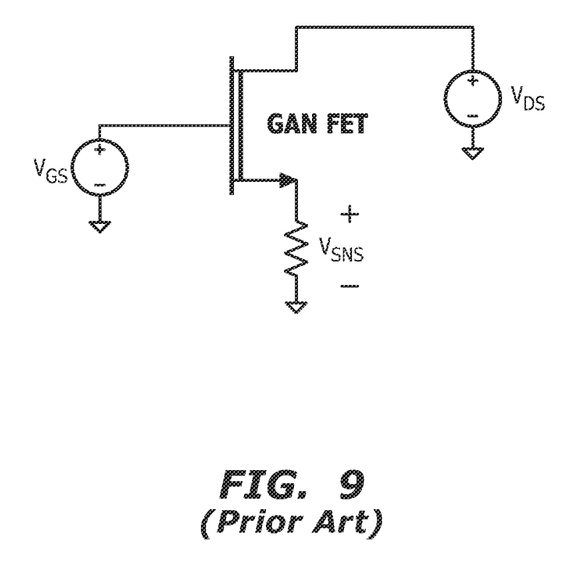
FIG. 9 illustrates a conventional circuit in which a resistor is used to pass a power current and to thereby measure the power current.

One advantage of the circuit 100 is that there is no resistor between the power transistor output node 113 and the low supply voltage. In some conventional technologies, there is such a resistor as is the case for a prior art current sense circuit illustrated in FIG. 9. For example, in FIG. 9, current is measured by allowing the entire power current to pass through a resistor, and then measure the voltage over that resistor. However, the power current is large and thus the power consumed (and heat generated) within the resistor is large as well. Thus, the circuit 100 avoids consuming power in such a resistor.

Figure 10:
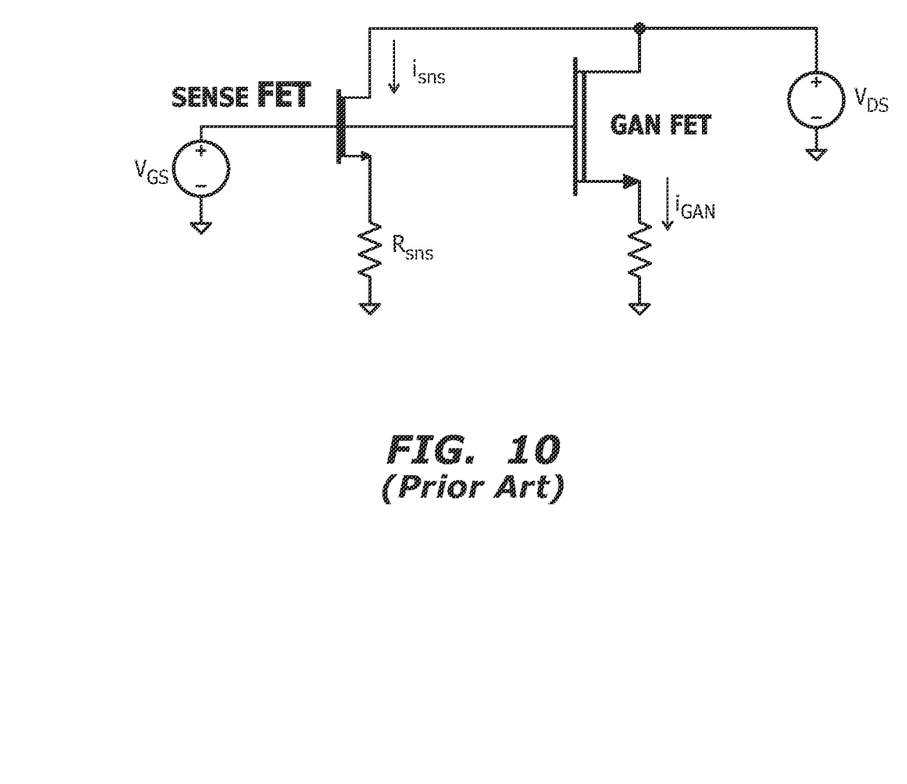
FIG. 10 illustrates a second conventional circuit that measures power current without a resistor in series with the power transistor, but in which the sense current varies in proportionality with the power current.

Another advantage of the circuit 100 is that the power current $I_{POWER}$ depends strongly on the sense current $I_{1SENSE}$, and is determined using the relationship of $I_{POWER}=(1/(1-Z\%))\times N\times I_{1SENSE}$, in which the variables Z and N are relatively fixed. This is not the case for another prior art current sense circuit illustrated in FIG. 10. For example, in FIG. 10, sense current is measured by allowing a smaller sense current to pass through a sense transistor, and then a sense resistor. The voltage is then measured over that resistor, and the smaller sense current can then be determined. However, due to the circuit design of FIG. 10, the power current passing through the power transistor cannot be consistently and accurately determined because the power current is not expressed in terms of relatively fixed variables.

Figure 11:
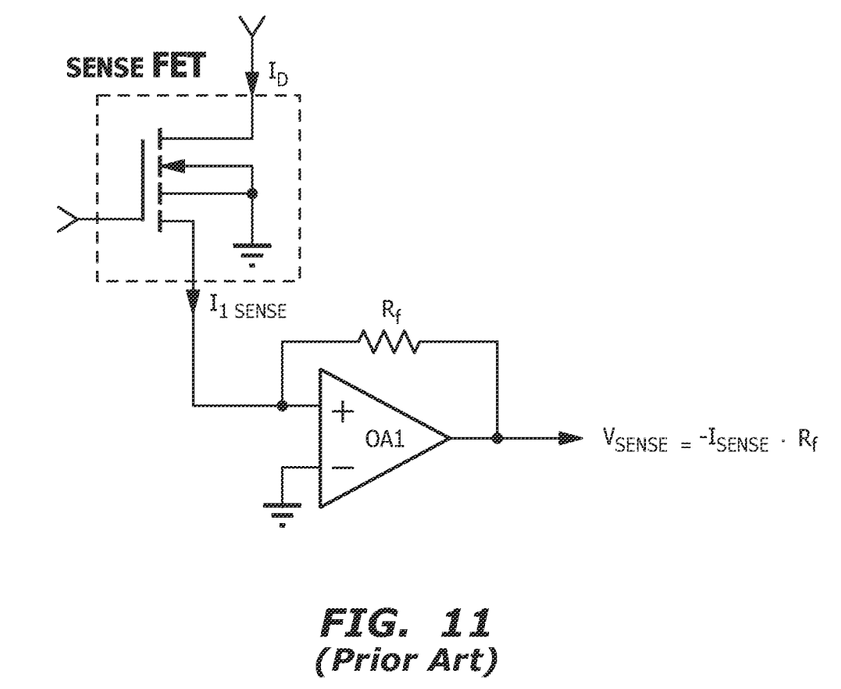
FIG. 11 illustrates a third convention circuit that measures power current, but with a negative supply voltage.

Lastly, another advantage of the circuit 100 is that, due to the use of the negative feedback circuit 150, a negative-voltage supply that sinks large current is not needed, as is the case for a prior art current sense circuit illustrated in FIG. 11. For example, in FIG. 11, an operational amplifier and feedback resistor are used to create a "virtual ground" at the output node of the sense transistor. This helps solve the issue of the previous prior art current sense circuit of FIG. 10, in which the power transistor current is not expressed in terms of relatively fixed variables. However, the example circuit of FIG. 11 requires a negative voltage supply that sinks large current, which requires many additional and complex components to achieve.

Accordingly, what has been described is a circuit and method for generating a highly accurate signal representing the power current passing through a power transistor. Such a circuit need not use a sense resistor coupled in series with the transistor, thus improving accuracy, increasing energy efficiency, and reducing heat generation. Further, the circuit uses a negative feedback circuit that allows the voltage drop ratio between the power transistor input and output nodes and the first sense transistor input and output nodes to become relatively fixed without the requirement of a large negative voltage supply.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:
1. A circuit comprising:
a power transistor having a power transistor control node that controls whether current flows from a power transistor input node to a power transistor output node;
a first sense transistor having a first sense transistor control node that controls whether current flows from a first sense transistor input node to a first sense transistor output node, the first sense transistor control node connected to the power transistor control node, and the first sense transistor input node connected to the power transistor input node;

a second sense transistor having a second sense transistor control node that controls whether current flows from a second sense transistor input node to a second sense transistor output node, the second sense transistor control node connected to the power transistor control node and to the first sense transistor control node, and the second sense transistor input node connected to the power transistor input node and to the first sense transistor input node;

a voltage divider connected between the second sense transistor output node and a reference voltage, the voltage divider being configured to provide at a divider output node a divided voltage that is between a source voltage when present on the second sense transistor output node and the reference voltage, the reference voltage also being applied to the output node of the power transistor; and a negative feedback circuit connected between the divider output node and the first sense transistor output node, the negative feedback circuit being configured to receive the divided voltage from the voltage divider, the negative feedback circuit being configured to force a first sense transistor output node voltage to be approximately equal to the divided voltage when the divided voltage is present on the divider output node.

2. The circuit in accordance with claim 1, further comprising a power transistor current determination component configured to:

measure a first sense transistor current that passes through the first sense transistor from the first sense transistor input node to the first sense transistor output node when 1) a control voltage is applied to the power transistor control node, the first sense transistor control node, and the second sense transistor control node, and 2) an input voltage is applied to the power transistor input node, the first sense transistor input node, and the second sense transistor input node; and using the measured first sense transistor current to generate a signal representing a power current passing through the power transistor from the power transistor input node to the power transistor output node.

3. The circuit according to claim 2, wherein the power transistor, the first sense transistor, and the second sense transistor have a control voltage that is within 0.2 volts of each other.

4. The circuit according to claim 2, wherein the power transistor, the first sense transistor, and the second sense transistor have a control voltage that is within 0.1 volts of each other.

5. The circuit according to claim 2, wherein the power transistor, the first sense transistor, and the second sense transistor have a control voltage that is within 0.05 volts of each other.

6. The circuit according to claim 2, wherein a first size ratio of a current flow width of the power transistor over a current flow width of the first sense transistor is 500 or more, a second size ratio of the current flow width of the power transistor over a current flow width of the second sense transistor is also 500 or more.

7. The circuit according to claim 6, wherein the power transistor current determination component is further configured to generate a signal representing the power current passing through the power transistor where the power current is a function of the first size ratio.

8. The circuit according to claim 1, wherein each of the power transistor, first sense transistor, and second sense transistors are manufactured on a same semiconductor substrate using the same semiconductor manufacturing techniques.

9. The circuit according to claim 8, wherein the power transistor, the first sense transistor, and the second sense transistor are each gallium nitride field-effect transistors.

10. The circuit according to claim 1, wherein the negative feedback circuit comprises an operational amplifier and a negative feedback transistor, the operational amplifier having an operational amplifier negative input node, an operational amplifier positive input node, and an operational amplifier output node, the operational amplifier negative input node being connected to the divider output node, the operational amplifier positive input node being connected to the first sense transistor output node, the negative feedback transistor having a negative feedback control node that controls whether current flows from a negative feedback transistor input node to a negative feedback transistor output node, the negative feedback control node connected to the operational amplifier output node, and the negative feedback transistor input node connected to the first sense transistor output node, and the operational amplifier negative input node being configured to receive the divided voltage from the voltage divider.

11. The circuit according to claim 10, wherein the operational amplifier is powered via a control voltage supplied to the power transistor control node, the first sense transistor control node, and the second sense transistor control node.

12. The circuit according to claim 1, wherein the reference voltage from the reference voltage source is ground.

13. The circuit according to claim 1, wherein the first sense transistor output node voltage is within 00.1 volts of the divided voltage when the divided voltage is present on the divider output node.

14. The circuit according to claim 1, wherein the voltage divider comprises a plurality of resistors coupled in series between the second sense transistor output node and the reference voltage source, the divider output node being an intermediate node in the series.

15. The circuit in accordance with claim 14, wherein the voltage divider further comprises one or more capacitors coupled in series with the plurality of resistors between the second sense transistor output node and a reference voltage source.

16. A method of generating a signal representing a power current passing through a power transistor from a power transistor input node to a power transistor output node, the method comprising:

applying an input voltage to the power transistor input node of the power transistor, a first sense transistor input node of a first sense transistor, and a second sense transistor input node of a second sense transistor, wherein the power transistor input node, the first sense transistor input node, and the second sense transistor input node are connected to each other;

applying a control voltage to a power transistor control node of the power transistor, a first sense transistor control node of the first sense transistor, and a second sense transistor control node of the second sense transistor, wherein the power transistor control node, the first sense transistor control node, and the second sense transistor control node are connected to each other; and forcing a first sense transistor output node voltage at a first sense transistor output node of the first sense transistor to be approximately equal to a divided voltage of a reference voltage and a voltage that is present on a second sense transistor output node of the second sense transistor, the reference voltage also being applied to the output node of the power transistor.

17. The method according to claim 16, the method further comprising:

measuring a first sense transistor current that passes through the first sense transistor from the first sense transistor input node to the first sense transistor output node when 1) the control voltage is applied to the power transistor control node, the first sense transistor control node, and the second sense transistor control node, and 2) the input voltage is applied to the power transistor input node, the first sense transistor input node, and the second sense transistor input node, and using the measured first sense transistor current to generate a signal representing the power current passing through the power transistor from the power transistor input node to the power transistor output node.

* * * * *